United States Patent
Nicholson

(10) Patent No.: US 10,218,926 B2
(45) Date of Patent: Feb. 26, 2019

(54) DEVICE, SYSTEM AND METHOD FOR CROSS-TALK REDUCTION IN VISUAL SENSOR SYSTEMS

(71) Applicant: CHRISTIE DIGITAL SYSTEMS USA, INC., Cypress, CA (US)

(72) Inventor: Stuart James Myron Nicholson, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 211 days.

(21) Appl. No.: 15/216,087

(22) Filed: Jul. 21, 2016

(65) Prior Publication Data

US 2018/0048834 A1  Feb. 15, 2018

(51) Int. Cl.
| | |
|---|---|
| *G06T 7/70* | (2017.01) |
| *H04N 5/359* | (2011.01) |
| *H04N 7/14* | (2006.01) |
| *H04N 9/04* | (2006.01) |
| *H04N 9/31* | (2006.01) |
| *G09G 3/34* | (2006.01) |
| *G09B 9/36* | (2006.01) |
| *H04N 13/334* | (2018.01) |
| *H04N 13/363* | (2018.01) |

(52) U.S. Cl.
CPC ............ *H04N 5/359* (2013.01); *H04N 7/144* (2013.01); *H04N 7/147* (2013.01); *H04N 9/045* (2013.01); *H04N 9/3147* (2013.01); *H04N 9/3182* (2013.01); *H04N 9/3194* (2013.01); *G09B 9/36* (2013.01); *G09G 3/3406* (2013.01); *H04N 13/334* (2018.05); *H04N 13/363* (2018.05)

(58) Field of Classification Search
None
See application file for complete search history.

(56) References Cited

U.S. PATENT DOCUMENTS 5,380,204 A  1/1995  Decker
2002/0140822 A1  10/2002  Kahn et al.
(Continued)

FOREIGN PATENT DOCUMENTS

DE  10200405210 A1  5/2006

OTHER PUBLICATIONS

Extended European Search Report (EESR) dated Oct. 2, 2017, by EPO, re European Patent Application No. 17159228.0.

*Primary Examiner* — Chikaodili E Anyikire
(74) *Attorney, Agent, or Firm* — Perry + Currier, Inc.

(57) ABSTRACT

A device, system and method of cross-talk reduction in visual sensor systems is provided. A display device is configured to provide first images viewable by a first visual sensor system, and second images, viewable by a second visual sensor system. The first images and the second images have common features which align when the first images and the second images are provided concurrently. The first images comprise wavelengths viewable by the second visual sensor system. A controller determines a second visual sensor system intensity component of the first images using a response curve of the second visual sensor system. The controller reduces intensity of the second images provided at the display device by the second visual sensor system intensity component of the first images, at least when the first images and the second images are concurrently provided.

16 Claims, 8 Drawing Sheets

(56) References Cited

U.S. PATENT DOCUMENTS

| | | | |
|---|---|---|---|
| 2006/0152524 A1* | 7/2006 | Miller | G06T 1/0028 |
| | | | 345/589 |
| 2006/0280360 A1* | 12/2006 | Holub | G01J 3/02 |
| | | | 382/162 |
| 2007/0218428 A1* | 9/2007 | Taffet | G09B 9/16 |
| | | | 434/41 |
| 2007/0260413 A1* | 11/2007 | Ehbets | G01J 3/02 |
| | | | 702/104 |
| 2007/0279489 A1 | 12/2007 | Jean-Jacques et al. | |
| 2011/0214082 A1* | 9/2011 | Osterhout | G02B 27/017 |
| | | | 715/773 |
| 2012/0212619 A1* | 8/2012 | Nagamune | H04N 5/2256 |
| | | | 348/164 |
| 2015/0138222 A1* | 5/2015 | Imaizumi | H04N 9/3182 |
| | | | 345/589 |
| 2015/0257735 A1* | 9/2015 | Ball | A61B 8/5261 |
| | | | 600/440 |
| 2016/0116736 A1* | 4/2016 | Andersson | G03B 21/2013 |
| | | | 353/13 |

* cited by examiner

Determine A Second Visual Sensor System Intensity Component Of The First Images Using The Response Curve Of The Second Visual Sensor System
301

Reduce Intensity Of The Second Images Provided At The Display Device By The Second Visual Sensor System Intensity Component Of The First Images, At Least When The First Images And The Second Images Are Concurrently Provided
303

DEVICE, SYSTEM AND METHOD FOR CROSS-TALK REDUCTION IN VISUAL SENSOR SYSTEMS

FIELD

The specification relates generally to projectors and display devices, and specifically to a device, system and method of cross-talk reduction in visual sensor systems.

BACKGROUND

When displaying an image, it may be desired that both unaided human eyes (human visual sensor system or HVS system) and viewers looking through night vision (NVIS) goggles may be able to see the appropriate information. Unfortunately, the HVS system and NVIS goggles have overlapping sensitivity regions such that red components of HVS system viewable images will stimulate NVIS goggles. Thus, items in the scene containing red will appear in the NVIS goggles. If an RGB display system is used, it is likely that most items will contain some red as the primaries are mixed to create all colors, and unless the desired green and blue gamut primaries match the display system's native primaries, even those colors will include some amount of red and thus appear in the NVIS goggles. The desired image for the HVS system and NVIS goggles likely differ, so separate image generators are often used, and the NVIS image generator may not be aware of the color or brightness of the HVS (visible) image at any point in the NVIS image.

SUMMARY

In general, this disclosure is directed to a device and method for cross-talk reduction in visual sensor systems in which first images viewable by a first visual sensor system and second images viewable by a second visual sensor system are concurrently provided at a display device. A second visual sensor system intensity component of the first images is determined using a response curve of the second visual sensor system, and the intensity of the second images is reduced by the second visual sensor system intensity component of the first images. In specific implementations, one or more projectors project RGB (red-green-blue) images viewable by a human visual system, and infrared images viewable by a night vision (NVIS) sensor system (which can include, for example NVIS goggles). An NVIS component of the RGB images is determined using a response curve of the NVIS sensor system, for example as a function of wavelength, and the intensity of the infrared images is reduced by the NVIS component of the RGB images. However, systems and methods provided herein can be applied to other systems and devices where images are provided concurrently to different visual sensor systems where cross-talk occurs there between.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a system comprising: a display device configured to provide first images, viewable by a first visual sensor system, and second images, viewable by a second visual sensor system, the first images and the second images having common features which align when the first images and the second images are provided concurrently, first images comprising wavelengths viewable by the second visual sensor system; and, a controller configured to: determine a second visual sensor system intensity component of the first images using a response curve of the second visual sensor system; and, reduce intensity of the second images provided at the display device by the second visual sensor system intensity component of the first images, at least when the first images and the second images are concurrently provided.

The system can further comprise a memory storing: a response curve of the second visual sensor system and spectral radiance curves of one or more of: light sources of the first projector; and the first images.

The display device can comprise one or more projectors configured to provide the first images and the second images concurrently by one or more of: interlacing the first images and the second images; alternating the first images and the second images; and co-projecting the first images and the second images.

The first visual sensor system can comprise a human visual system and the second visual sensor system can comprise a night vision sensor ("NVIS") system.

The first visual sensor system can comprise a human visual system and the second visual sensor system can comprise a night vision ("NVIS") sensor system; and the response curve can comprise one or more of: an NVIS response curve; an NVIS-A response curve; and an NVIS-B response curve.

The first images can comprise one or more of blue images, green images and red images, and the second images comprise infrared images, the controller can be further configured to determine the second visual sensor system intensity component of the first images using the response curve of the second visual sensor system by: multiplying, at the controller, the response curve by each spectral radiance curve of one or more of: each light source of the first projector, and the first images; and summing, at the controller, results of each multiplication.

The first images can comprise one or more of blue images, green images and red images, and the second images comprise the red images, the controller can be further configured to determine the second visual sensor system intensity component of the first images using the response curve of the second visual sensor system by: multiplying, at the controller, the response curve by each spectral radiance curve of one or more of: each light source of the first projector, and the first images; and summing, at the controller, results of each multiplication.

The controller can be further configured to reduce the intensity of the second images provided at the display device by the second visual sensor system intensity component by integrating the second visual sensor system intensity component to determine a total intensity thereof, and reducing the intensity of the second images by the total intensity, independent of wavelength.

The controller can be further configured to determine the second visual sensor system intensity component of the first images using the response curve of the second visual sensor system as a function of wavelength.

The controller can be further configured to reduce the intensity of the second images provided at the display device by the second visual sensor system intensity component of the first images, as a function of wavelength.

Another aspect of the specification provides a method comprising: at a system comprising: a display device configured to provide first images, viewable by a first visual sensor system, and second images, viewable by a second visual sensor system, the first images and the second images having common features which align when the first images and the second images are provided concurrently, first images comprising wavelengths viewable by the second visual sensor system; and, a controller, determining, at the controller, a second visual sensor system intensity component of the first images using a response curve of the second visual sensor system; and, reducing, at the controller, intensity of the second images provided at the display device by the second visual sensor system intensity component of the first images, at least when the first images and the second images are concurrently provided.

The display device can comprise one or more projectors configured to provide the first images and the second images concurrently by one or more of: interlacing the first images and the second images; alternating the first images and the second images; and co-projecting the first images and the second images.

The first visual sensor system can comprise a human visual system and the second visual sensor system can comprise a night vision sensor ("NVIS") system.

The first visual sensor system can comprise a human visual system and the second visual sensor system can comprise a night vision ("NVIS") sensor system; and the response curve can comprise one or more of: an NVIS response curve; an NVIS-A response curve; and an NVIS-B response curve.

The first images can comprise one or more of blue images, green images and red images, and the second images comprise infrared images, and the method can further comprise determining the second visual sensor system intensity component of the first images using the response curve of the second visual sensor system by: multiplying, at the controller, the response curve by each spectral radiance curve of one or more of: each light source of the first projector, and the first images; and summing, at the controller, results of each multiplication.

The first images comprise one or more of blue images, green images and red images, and the second images comprise the red images, and the method can further comprise determining the second visual sensor system intensity component of the first images using the response curve of the second visual sensor system by: multiplying, at the controller, the response curve by each spectral radiance curve of one or more of: each light source of the first projector, and the first images; and summing, at the controller, results of each multiplication.

The method can further comprise reducing the intensity of the second images provided at the display device by the second visual sensor system intensity component by integrating the second visual sensor system intensity component to determine a total intensity thereof, and reducing the intensity of the second images by the total intensity, independent of wavelength.

The method can further comprise determining the second visual sensor system intensity component of the first images using the response curve of the second visual sensor system as a function of wavelength.

The method can further comprise reducing the intensity of the second images provided at the display device by the second visual sensor system intensity component of the first images, as a function of wavelength.

Another aspect of the specification provides a computer-readable medium storing a computer program, wherein execution of the computer program is for: at a system comprising: a display device configured to provide first images, viewable by a first visual sensor system, and second images, viewable by a second visual sensor system, the first images and the second images having common features which align when the first images and the second images are provided concurrently, first images comprising wavelengths viewable by the second visual sensor system; and, a controller, determining, at the controller, a second visual sensor system intensity component of the first images using a response curve of the second visual sensor system; and, reducing, at the controller, intensity of the second images provided at the display device by the second visual sensor system intensity component of the first images, at least when the first images and the second images are concurrently provided. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 2 depicts a block diagram of a flowchart of a method for cross-talk reduction, according to non-limiting implementations.

DETAILED DESCRIPTION

Figure 1:
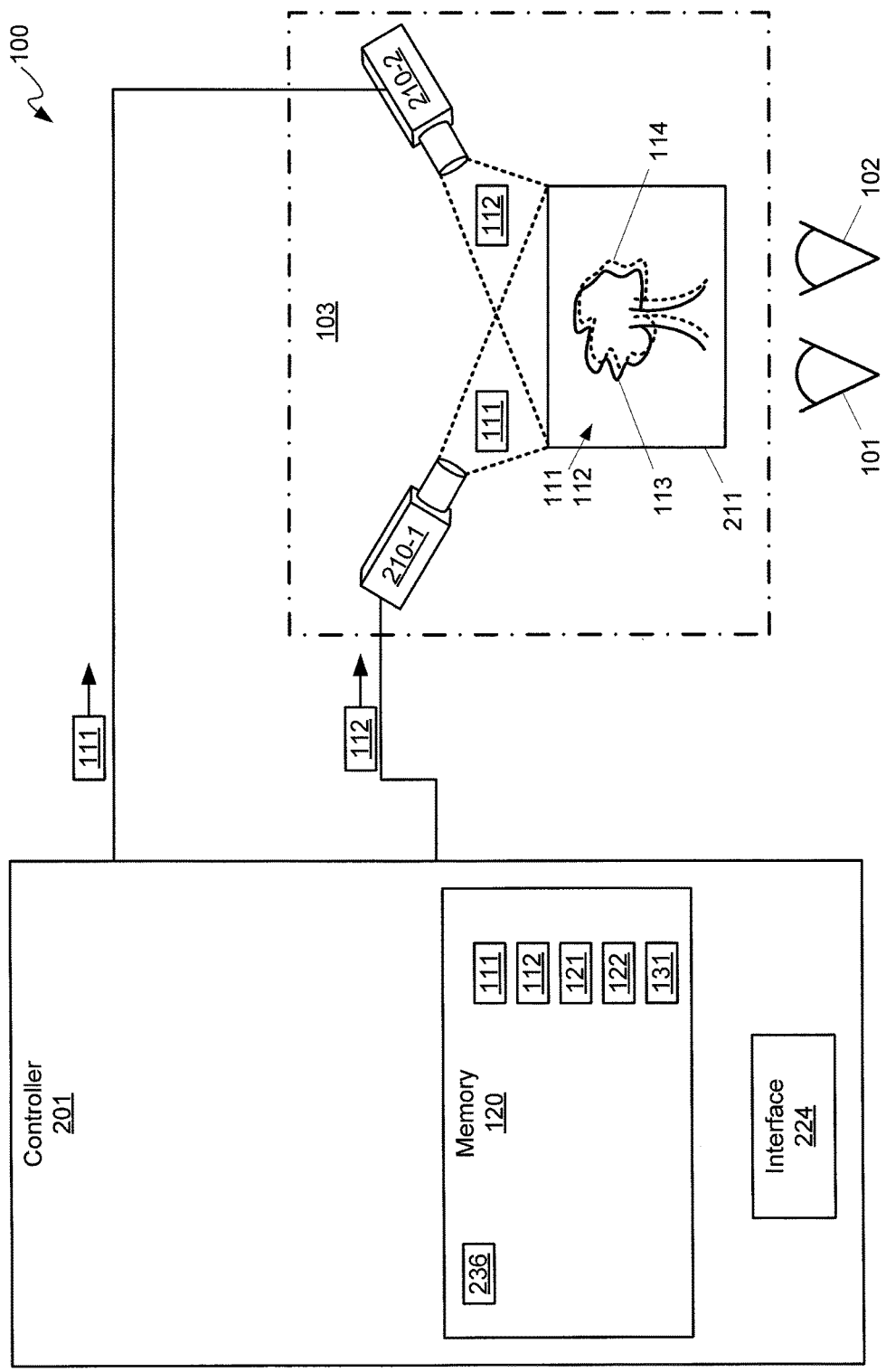
FIG. 1 depicts a system for cross-talk reduction in visual sensor systems, according to non-limiting implementations.

Attention is directed to FIG. 1 which depicts a system 100 for reducing cross-talk in visual sensor systems. System 100 comprises: a first visual sensor system 101, and a second visual sensor system 102, respective wavelength sensitivity ranges of first visual sensor system 101 and second visual sensor system 102 can partially overlap; a display device 103 configured to provide first images 111, viewable by first visual sensor system 101, and second images 112, viewable by second visual sensor system 102, first images 111 and second images 112 having common features 113, 114 which align when first images 111 and second images 112 are provided concurrently, and first images 111 comprising wavelengths viewable by second visual sensor system 102; a controller 201; and a memory 120 storing: a response curve 122 of second visual sensor system 102. Controller 201 is generally configured to: determine a second visual sensor system intensity component of first images 111 using response curve 122 of second visual sensor system 102; and, reduce intensity of second images 112 provided at display device 103 by the second visual sensor system intensity component of first images 112, at least when first images 111 and second images 112 are concurrently provided.

As depicted, memory 120 is a component of controller 201, which further comprises a communication interface 224.

Furthermore, as depicted, display device 103 comprises two projectors 210-1, 210-2 (interchangeably referred to hereafter, collectively, as projectors 210 and, generically, as a projector 210), and a screen 211 onto which images 111, 112 are respectively projected by projectors 210-1, 210-2.

Each projector 210 can comprise a digital projector configured to digitally project images 111, 112 using a respective light modulator. Projector 210 can include, but are not limited to, DLP™ (digital light processing) DMD (digital multimirror device) based projectors, an LCOS (Liquid Crystal on Silicon) based projectors, and the like; however any type of projector which can project images 111, 112 is within the scope of present implementations. While not depicted, system 100 and/or each projector 210 can comprise other devices, including, but not limited to, warping devices and the like, configured to warp projection data for projection by projectors 210 onto a surface. For example, each projector 210 can comprise a respective controller configured to receive respective images 111, 112 from controller 201, in the form of projector data, and the like, and warp and/or adapt respective images 111, 112 for projection onto screen 211. In particular, each projector 210 comprises one or more respective light sources and/or illuminators configured to illuminate a respective light modulator.

Furthermore, while only two projectors 210 are depicted, system 100 can comprise a plurality of projectors 210 and/or three or more projectors, each configured to project respective projection data comprising, for example, portions of a larger tiled image to be projected.

Display device 103 can alternatively comprise one projector, adapted to interlace images 111, 112, and/or alternate projecting of images 111, 112.

Display device 103 can hence comprise one or more projectors 210 configured to provide first images 111 and second images 112 concurrently by one or more of: interlacing first images 111 and second images 112; alternating first images 111 and second images 112; and co-projecting (as depicted) first images 111 and second images 112.

System 100 can comprise a simulation environment and/or a visualization environment, such a flight simulator used to train pilots under night flying. As such, in these implementations, first images 111 comprise images that are viewable by a human visual system, and can comprise, for example a combination of red images, green images and blue images ("RGB" (red-green-blue") images); and second images 111 can comprise the same and/or similar images as first images 111, but viewable by night vision devices, such as NVIS goggles and the like. Hence, in these implementations, projector 210-1 is generally configured to project light, including images 111, in a wavelength range visible to a human visual system such as about 400 nm to about 700 nm; and projector 210-2 is generally configured to project infrared light, including images 112, in a wavelength range visible to an NVIS device, such as about 580 nm to about 900 nm (NVIS-A), and/or about 620 nm to about 900 nm (NVIS-B).

In particular, for example, projector 210-1 can comprise an RGB projector comprising a red light source, a green light source and blue light source (e.g. three light sources and/or illuminators), all of which are visible to a human visual sensor ("HVS") system; further, projector 210-2 can comprise an infrared projector comprising an infrared light source, visible to night vision devices. Each projector 210 can be configured to control an intensity and/or a relative intensity of each respective light source. In some implementations, each projector 210 can control a contribution of each respective light source to a respective image 111, 112 by increasing or reducing a total intensity (e.g. by increasing or decreasing power to a respective light source, and/or by using modulation schemes, for example pulse width modulation and the like at a respective modulator). For example, in these implementations, a particular shape of a spectral radiance curve of a color component of each respective image 111, 112 doesn't change, but merely a relative intensity. In other implementations, one or more projectors 210 can be configured to control a spectral radiance curve of a color component of each respective image 111, 112 at least partially as a function of wavelength.

In any event, in these particular implementations, first visual sensor system 101 can comprise a human visual system and/or a human visual sensor ("HVS") system, configured to view images in a range of wavelengths viewable by a human being, which can include, but is not limited to about 400 nm to about 700 nm. First visual sensor system 101 can comprise one or more human eyes, however first visual sensor system 101 can comprise one or more cameras, charge-coupled devices (CCDs), and even camera film sensitive to light in a range of about 400 nm to about 700 nm. In particular, first visual sensor system 101 can detect first images 111, when provided by display device 103, and visually convey first images 111 to a user.

In particular implementations where first visual sensor system 101 comprises an HVS system, second visual sensor system 102 can comprise one or more of a night vision ("NVIS") sensor system, night vision (NVIS) goggles, an NVIS device, an NVIS heads-up display system, an infrared detector and the like. In particular, first visual sensor system 101 detects light according to response curve 121 described in more detail below. When second visual sensor system 102 comprise an NVIS device and the like, the NVIS devices, and the like, can comprise NVIS-A goggles and/or an NVIS-A device, and/or NVIS-B goggles and/or an NVIS-B device, each detecting infrared light according to response curve 122 (which, can comprise a plurality of response curves, for example an NVIS-A response curve and an NVIS-B response curve). When second visual sensor system 102 comprises an NVIS device, second visual sensor system 102 can sense images 111, 112 independent of wavelength other than detecting light according to response curve 121. In other words, images rendered by second visual sensor system 102 are generally monochromatic (e.g. black and white, black and green, black and yellow, and the like) as such NVIS devices can be configured to show where, in a field of view of second visual sensor system 102 infrared light is present or not present, without reference to a wavelength of the infrared light.

Furthermore, while each of visual sensor systems 101, 102 are depicted as side-by-side in FIG. 1, in other implementations, second visual sensor system 102 can be used in conjunction with first visual sensor system 101, for example, when a user is wearing NVIS goggles.

Response curve 122 can be provisioned at memory 120 accordingly, depending on a type of NVIS devices, and the like, used with system 100. In general, NVIS devices are sensitive to infrared light; for example for NVIS-A devices detect infrared light in a range of about 580 nm to about 900 nm, and NVIS-B devices detect infrared light in a range of about 620 to about 900 nm. Hence, in these implementations, second visual sensor system 102 can detect second images 112, when provided by display device 103, and visually convey second images 112 to a user. As such, it is understood that respective wavelength sensitivity ranges of first visual sensor system 101 and second visual sensor system 102 can at least partially overlap; hence, first images 111 produced for viewing by first visual sensor system 101 comprise wavelengths also viewable by second visual sensor system 102, as described below.

Hence, as depicted, first visual sensor system 101 can comprise a human visual sensor system and second visual sensor system 102 can comprise a night vision sensor ("NVIS") system. Furthermore, when first visual sensor system 101 comprises a human visual system and second visual sensor system comprises a night vision ("NVIS") sensor system, response curve 122 can comprises one or more of: an NVIS response curve; an NVIS-A response curve; and an NVIS-B response curve.

Furthermore, each of the NVIS-A, NVIS-B wavelength ranges (580 nm to about 900 nm, and 620 nm to about 900 nm) overlap with the HVS wavelength range (400 nm to about 700 nm). Hence, when first images 111 have a component in a range of about 580 nm to about 700 nm, such a component is viewable by second visual sensor system 102. Hence, first images 111 can contribute to the brightness of second images 112.

As depicted images 111, 112 each comprise a common feature 113, 114 of a tree: while the depicted tree in each of images 111, 112 are offset, such an offset is merely shown for clarity, and it is appreciated that the depicted tree in each of images 111, 112 will be aligned, and/or projected one-on-top-of-the-other such that each feature in the tree in images 111 is generally aligned with each corresponding feature in the tree in images 112.

In other words, images 111, 112 generally have similar content, but images 111 are provided in an HVS wavelength range such that images 111 are visible to first visual sensor system 101, such as a human eye, and the like, and images 112 are provided in an infrared wavelength range such that images 112 are visible to second visual sensor system 102, such as NVIS goggles, and the like.

It is understood by persons of skill in the art that images 111, 112 do not need to be identical; for example, features that may be visible in an HVS wavelength range may not be visible in an infrared wavelength range, and hence such features can be included in first images 111 and omitted from second images 112 (and vice versa). However, common features (e.g. a tree canopy) that are visible in both an HVS wavelength range and an infrared wavelength range are aligned when projected onto screen 211, and positions of features that are particular to a given wavelength range are nonetheless provided consistently in each of images 111, 112 relative to the common features 113, 114. In other words, a designer of images 111, 112 ensures that the user experience of system 100 is consistent with operating an airplane at night (for example when system 100 comprises a flight simulator).

Hence, when a user is viewing screen 211 with the naked eye, images 111 are visible, and when the user puts on NVIS goggles, the user sees the same scene in infrared wavelengths by viewing images 112 through the NVIS goggles. Different features of the scene may be visible depending on whether the user is wearing or not wearing the NVIS goggles, and such differences can be encoded into images 111, 112.

Regardless, a portion of images 111 will also be visible through the goggles as response curve 122 includes some visible wavelengths, which can provide an undesirable user experience. Indeed, when system 100 includes a flight simulator, and the like, such overlap in wavelength sensitivity ranges can even ultimately be dangerous as it provides a pilot being trained to operate an airplane, and the like, using NVIS goggles with an incorrect understanding of the experience which could later lead to problems when operating airplanes, and the like, in night flying conditions using NVIS goggles.

Hence, system 100 further comprises controller 201 which is adapted to address this issue, as described hereafter.

Controller 201 can include, but is not limited to, one or more of a content player, an image generator, and image renderer, and the like which processes and/or "plays" and/or generates images 111, 112, for example by producing projection data suitable for processing and projection by each projector 210. Controller 201, can comprise any suitable computing device, including but not limited to a graphics processing unit (GPU), a graphics processing device, a graphics processing engine, a video processing device, a personal computer (PC), a server, and generally memory 120 and a communication interface 224 (interchangeably referred to hereafter as interface 224) and optionally any suitable combination of input devices and display devices.

Controller 201 can hence comprise, for example, a server and the like, configured to generate and/or render images as image data, including, but not limited to images 111, 112. Alternatively, controller 201 can generate images 111, 112 using algorithms, and the like, for generating images. Indeed, it is appreciated that images 111, 112 can be stored at memory 120 as data (as depicted) and/or generated in "real-time", transmitted to each of projectors 210, in the form of projection data, which then uses the projection data to control a respective light modulator to modulate light to form and project respective images 111, 112 onto screen 211.

Each of images 111, 112 can hence include, but is not limited to, one or AVI files, one or more JPG files, a PNG file, and the like. When images 111, 112 are provided to each of projectors 210 in the form of projection data, the projection data can include, but is not limited to, HDMI data, VGA data, and/or video transport data. In other words, controller 201 can process images 111, 112 to produce respective projection data which is transmitted to each projector 210 each of which, in turn, processes the respective projection data into a format suitable for projection by a respective projector 210. However, a wide variety of architectures and image formats are within the scope of present implementations.

Controller 201 comprise a processor and/or a plurality of processors, including but not limited to one or more central processors (CPUs) and/or one or more processing units and/or one or more graphic processing units (GPUs); either way, controller 201 comprises a hardware element and/or a hardware processor. Indeed, in some implementations, controller 201 can comprise an ASIC (application-specific integrated circuit) and/or an FPGA (field-programmable gate array) specifically configured to implement the functionality of controller 201. Hence, controller 201 is not necessarily a generic computing device and/or a generic processor and/or a generic component, but a device specifically configured to implement specific functionality, as described in further detail below. For example, controller 201 can specifically comprise an engine configured for cross-talk reduction in visual sensor systems.

Memory 120 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of controller 201 as described herein are typically maintained, persistently, in memory 120 and used by controller 201 which makes appropriate utilization of volatile storage during the execution of such programming instructions. Those skilled in the art recognize that memory 120 is an example of computer readable media that can store programming instructions executable on controller 201. Furthermore, memory 120 is also an example of a memory unit and/or memory module and/or a non-volatile memory.

In particular, memory 120 stores an application 236, which, when processed by controller 201, enables controller 201 to: determine a second visual sensor system intensity component of first images 111 using response curve 122 of second visual sensor system 102; and, reduce intensity of second images 112 provided at display device 103 by the second visual sensor system intensity component of first images 111, at least when first images 111 and second images 112 are concurrently provided.

As depicted, memory 120 further stores an HVS response curve 121 of first visual sensor system 101, which can be provisioned at memory 120 accordingly, for example when an intensity of first images 111 is to be reduced by a first visual sensor system intensity component of second images 112; however, in general, provisioning of response curve 121 at memory 120 is optional.

As depicted, memory 120 further stores spectral radiance curves 131 of respective light sources of each of projectors 210, as described in more detail below.

Furthermore, specific functionality of components of system 100 can be maintained at controller 201. For example, as described above, controller 201 can further play and/or generate image data to produce projection data specific to a given projector 210, which is in turn transmitted to projectors 210, each of which projects respective images 111, 112 based on the received projection data.

Interface 224 comprises any suitable wired or wireless communication interfaces which enable controller 201 to communicate with each projector 210 via a respective communication link, which can comprise wired and/or wireless communication links.

Figure 3:
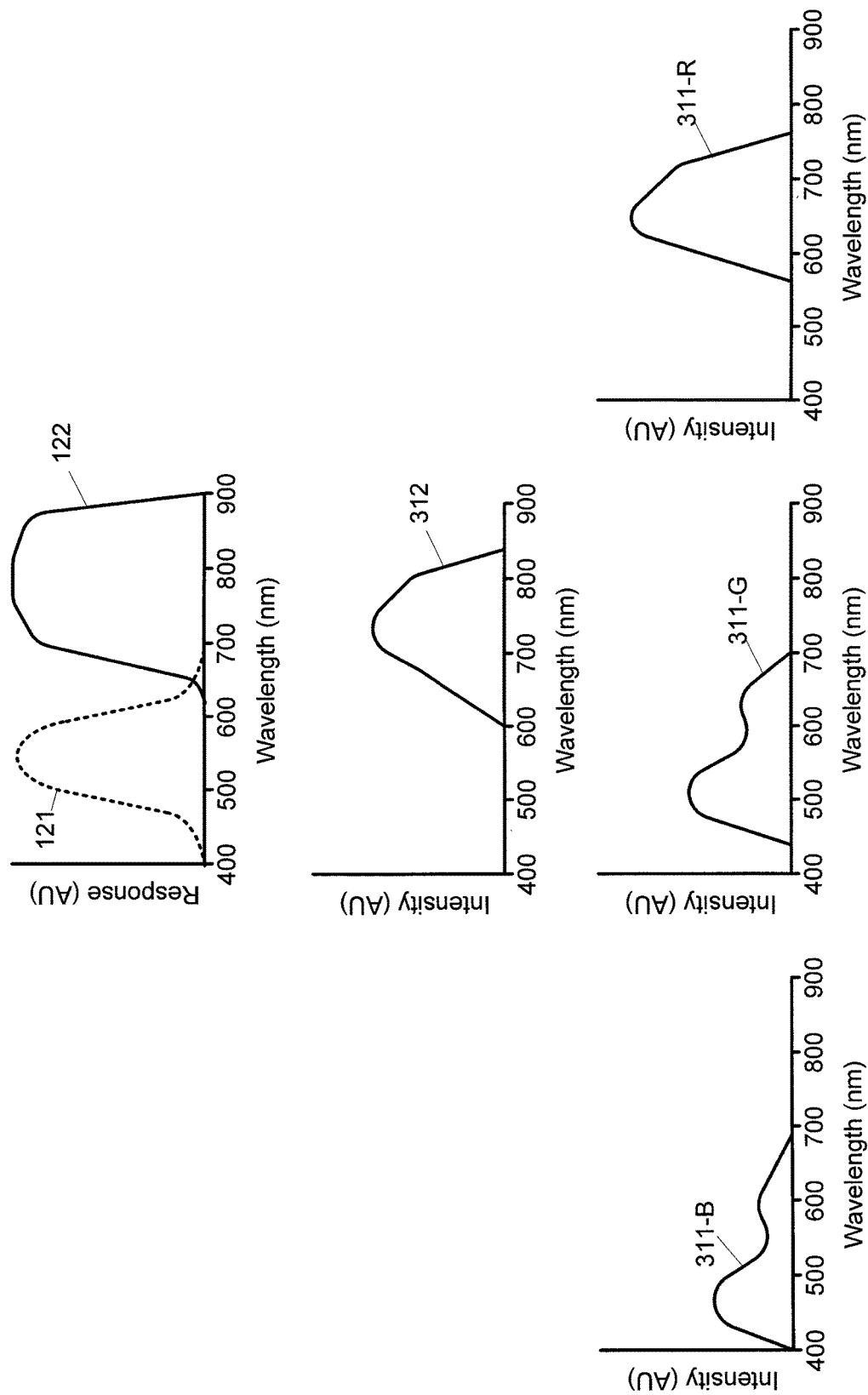
FIG. 3 depicts response curves of the visual sensor system of the system of FIG. 1, as well as spectral radiance curves for each of red-green-blue components of an image viewable by a human visual system and a spectral radiance curve of infrared images viewable by night vision goggles, according to non-limiting implementations.

Attention is now directed to FIG. 3 which depicts a flowchart of a method 300 for reducing cross-talk in visual sensor systems, according to non-limiting implementations. In order to assist in the explanation of method 300, it will be assumed that method 300 is performed using system 100, and specifically by controller 201, for example when controller 201 processes application 236. Indeed, method 300 is one way in which system 100 and/or controller 201 can be configured. Furthermore, the following discussion of method 300 will lead to a further understanding of controller 201, and system 100 and its various components. However, it is to be understood that system 100 and/or controller 201 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 100 as well.

At block 301, controller 201 determine a second visual sensor system intensity component of first images 111 using response curve 122 of second visual sensor system 102.

At block 303, controller 201 reduces intensity of second images 112 provided at display device 103 by the second visual sensor system intensity component of first images 111, at least when first images 111 and second images 112 are concurrently provided.

Method 300 will now be described with respect to FIG. 3 to FIG. 5.

Attention is next directed to FIG. 3 which depicts a non-limiting example of response curve 121 of first visual sensor system 101 and a response curve 122 of second visual sensor system 102; as depicted, response curve 121 corresponding to a spectral sensitivity of a human eye, and response curve 122 comprises an NVIS-B response curve. As described above, provisioning of response curve 121 at memory 120 can be optional.

FIG. 3 further depicts a non-limiting example of a blue spectral radiance curve 311-B, a green spectral radiance curve 311-G and a red spectral radiance curve 311-R of at least one pixel of images 111, as a function of wavelength, as well as a non-limiting example of a spectral radiance curve 312 of at least one pixel of images 112, as a function of wavelength, each of which clearly includes an infrared component (e.g. wavelengths over about 700 nm). Spectral radiance curves 311-B, 311-G, 311-R will be interchangeably referred to herein, collectively, as spectral radiance curves 311 and, generically, as a spectral radiance curve 311. Furthermore, each of response curves 121, 122 and spectral radiance curves 311, 312 are provided in arbitrary units (AU). Furthermore, spectral radiance curves 311, 312 can be stored at memory 120 as subsets of spectral radiance curves 131. In addition, it is appreciated that each of spectral radiance curves 311, 312 are provided as examples only, and furthermore spectral radiance curves 311 are provided to illustrate that any of blue, green and red light sources of projector 210 can comprise an infrared component. In practise, however, blue, green and red light sources of RGB projectors can have spectral radiance curves that are centred on given blue, green and red wavelengths, with a smaller spread in wavelengths than depicted in each spectral radiance curves 311. Similarly, spectral radiance curve 312 represents an example spectral radiance curve of an infrared light source where non-infrared components (e.g. including HVS visual components) are exaggerated.

In particular, response curve 122 represents a sensitivity of second visual system 102 as a function of wavelength. Similarly, spectral radiance curves 311, 312 each represent intensity as a function of wavelength for corresponding pixels in each of images 111, 112. For example, spectral radiance curves 311-B, 311-G, 311-R can comprise spectral radiance curves of one or more blue, green and red pixels which form part of common feature 113 in images 111, and spectral radiance curve 312 can comprise a spectral radiance curve of an infrared pixel which forms the same part of common feature 114 in images 112 that is correspondingly formed by the one or more pixels represented by spectral radiance curves 311-B, 311-G, 311-R.

In other words, at any given time, pixels having spectral radiance curves 311, 312 can be concurrently provided at screen 211, such pixels being aligned and/or overlapping. Further, as each of spectral radiance curves 311 clearly have a respective portion which overlaps with response curve 122, at least this overlapping portion is viewable by second visual sensor system 102.

Figure 4:
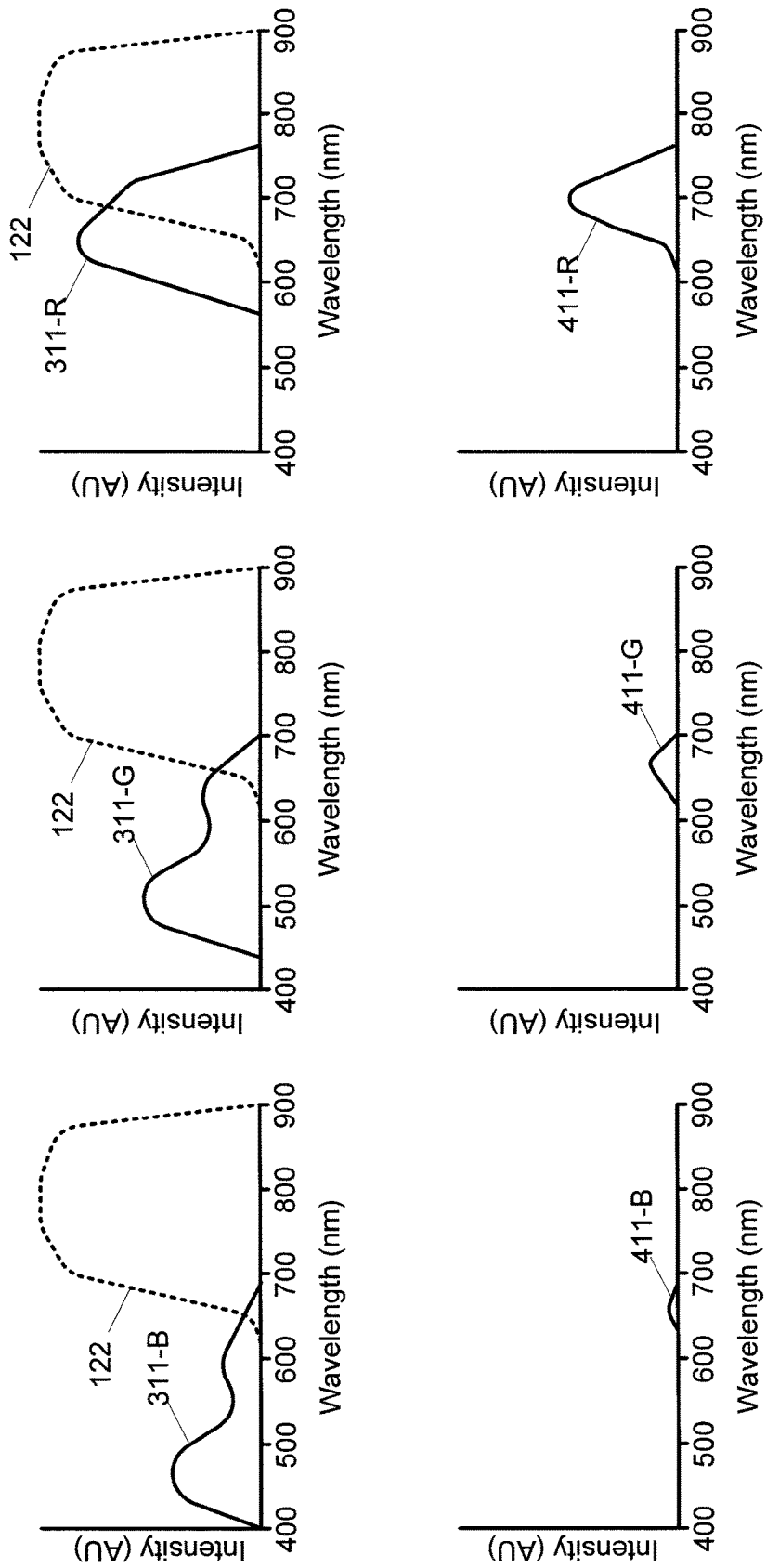
FIG. 4 depicts a determination of an infrared contribution of each of the red-green-blue components of the image viewable by a human visual system depicted in FIG. 3, according to non-limiting implementations.

For example, attention is next directed to FIG. 4 which depicts, in a top row, response curve 122 overlaid on each of spectral radiance curves 311-B, 311-G, 311-R. An overlapping region can be determined by multiplying response curve 122 by each of spectral radiance curves 311-B, 311-G, 311-R. Hence, a bottom row of FIG. 4 depicts second visual sensor system intensity components 411-B, 411-G, 411-R of first images 111. Specifically, each of intensity components 411-B, 411-G, 411-R are determined by multiplying response curve 122 by each spectral radiance curve 311-B, 311-G, 311-R of first images 111 (e.g. at block 301 of method 300).

Figure 5:
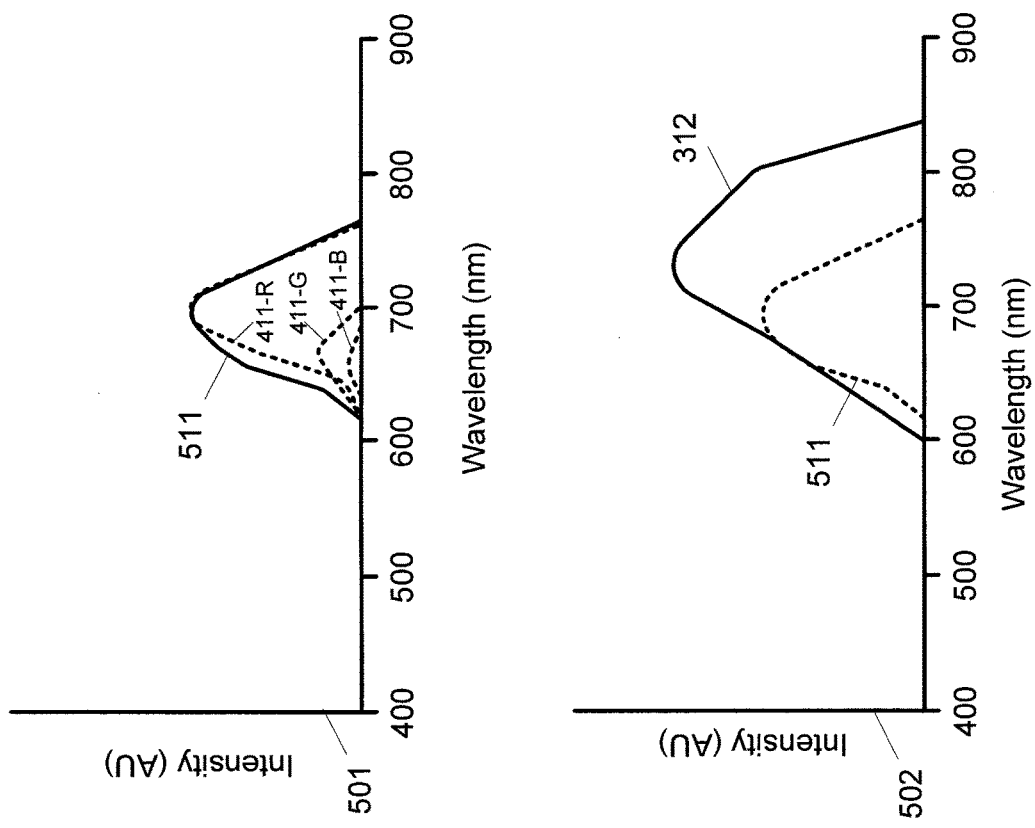
FIG. 5 depicts a determination a summing of the infrared contribution of each of the red-green-blue components of the image viewable by a human visual system depicted in FIG. 3, according to non-limiting implementations.

Attention is next directed to FIG. 5 which depicts, at graph 501 a total second visual sensor system intensity components 511 determined by summing, as a function of wavelength, each of components 411-B, 411-G, 411-R. In graph 502, total second visual sensor system intensity component 511 is overlaid on spectral radiance curve 312 of images 112. Without correction, total second visual sensor system intensity component 511 will be viewed by second visual sensor system 102 concurrently with spectral radiance curve 312, which can mean that common features provided in both images 111, 112 (e.g. common features 113, 114) appear brighter than intended to second visual sensor system 102. Hence, to correct this situation, controller 201 sums each of components 411-B, 411-G, 411-R to produce total second visual sensor system intensity component 511 and reduces intensity of second images 112 by second visual sensor system intensity component 511 of first images 111. Various implementations for reducing intensity of second images 112 by second visual sensor system intensity component 511 of first images 111 are within the scope of the present specification.

Figure 6:
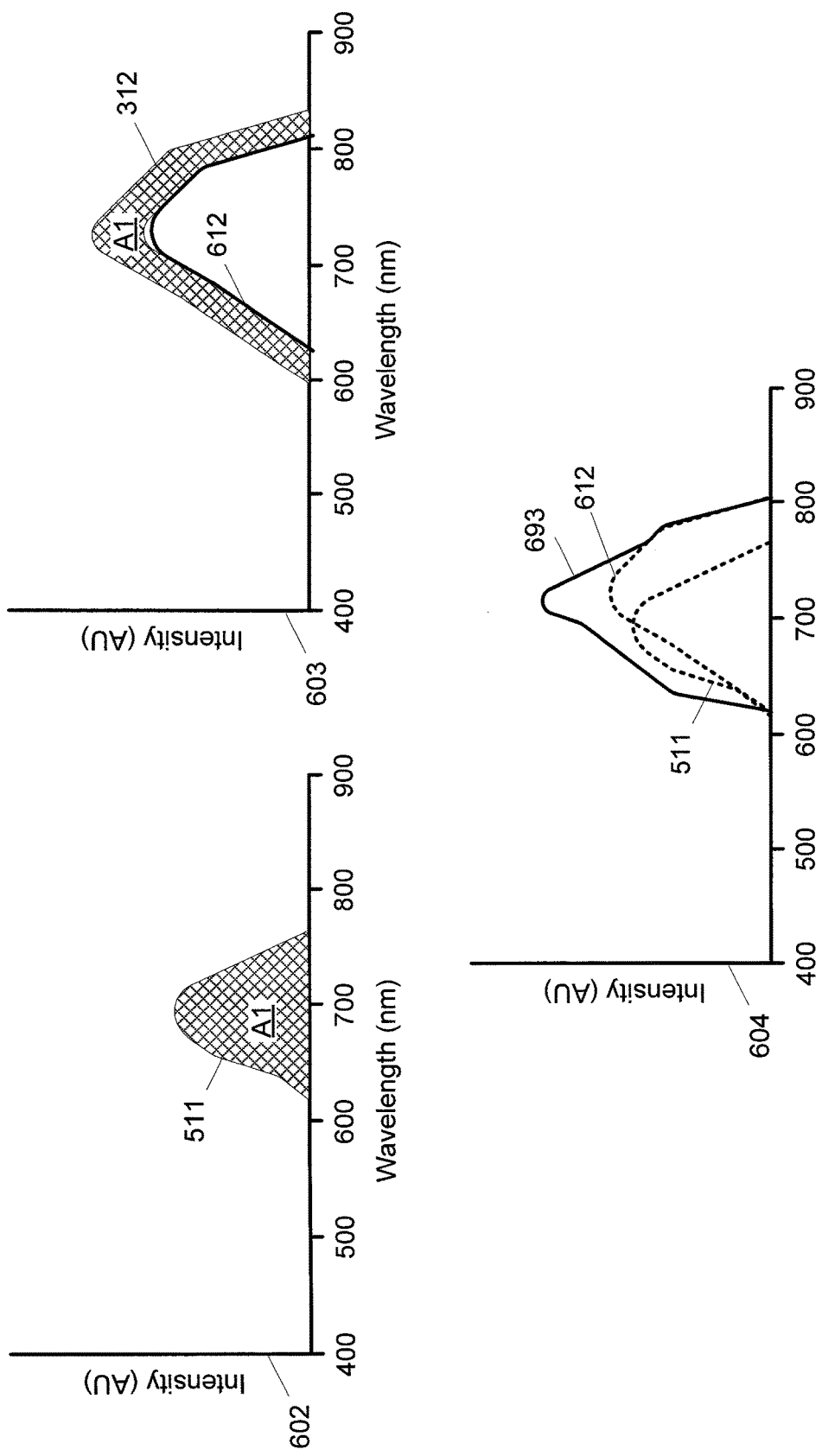
FIG. 6 depicts a reduction of intensity of the infrared images by integrating a night vision goggle response to the red-green-blue components of an image viewable by a human visual system to determine a total intensity thereof, and reducing the intensity of infrared images by the total intensity, independent of wavelength, according to non-limiting implementations.

For example, attention is next directed to FIG. 6 which depicts implementations in which intensity of second images 112 provided at display device 103 is reduced by second visual sensor system intensity component 511 by: integrating second visual sensor system intensity component 511 to determine a total intensity thereof, and reducing the intensity of second images 112 by the total intensity, independent of wavelength. For example, as depicted in graph 602, an area A1 of second visual sensor system intensity component 511 is determined by integrating under the curve representing second visual sensor system intensity component 511, such that area A1 represents the total intensity of second visual sensor system intensity component 511. Then, as depicted in graph 603, a total intensity of spectral radiance curve 312 is reduced by an intensity corresponding to area A1; hence, in graph 603, spectral radiance curve 312 is reduced by a total intensity "A1" to a reduced spectral radiance curve 612. For example, as depicted in graph 604, summing reduced spectral radiance curve 612 and second visual sensor system intensity component 511 will result in a total intensity curve 693 having an area similar to that of spectral radiance curve 312 and hence a similar brightness of images 112 results. For example, a brightness of common features 113 of images 111 will contribute to the brightness of common features 114 of images 112 at second visual sensor system 102.

As depicted, a shape of such a total intensity curve 693 can have a spectral shape different from spectral radiance curve 312. However, as second visual sensor system 102 may not be sensitive to wavelength, other than to received images 111, 112 according to response curve 121, the change in spectral shape of total intensity curve 693 (as compared to spectral radiance curve 312) will not affect images 112.

Reduction of spectral radiance curve 312 to reduced spectral radiance curve 612 can occur by one or more of reducing an intensity of an infrared light source at projector 210-2, and using modulation schemes at projector 210-1 (including, but not limited to pulse width modulation and the like at a modulator thereof). Such a reduction in intensity is generally independent of wavelength in that reduced spectral radiance curve 612 corresponds to a dimmed version of spectral radiance curve 312, and each of curve 312, 612 generally have a similar shape.

Figure 7:
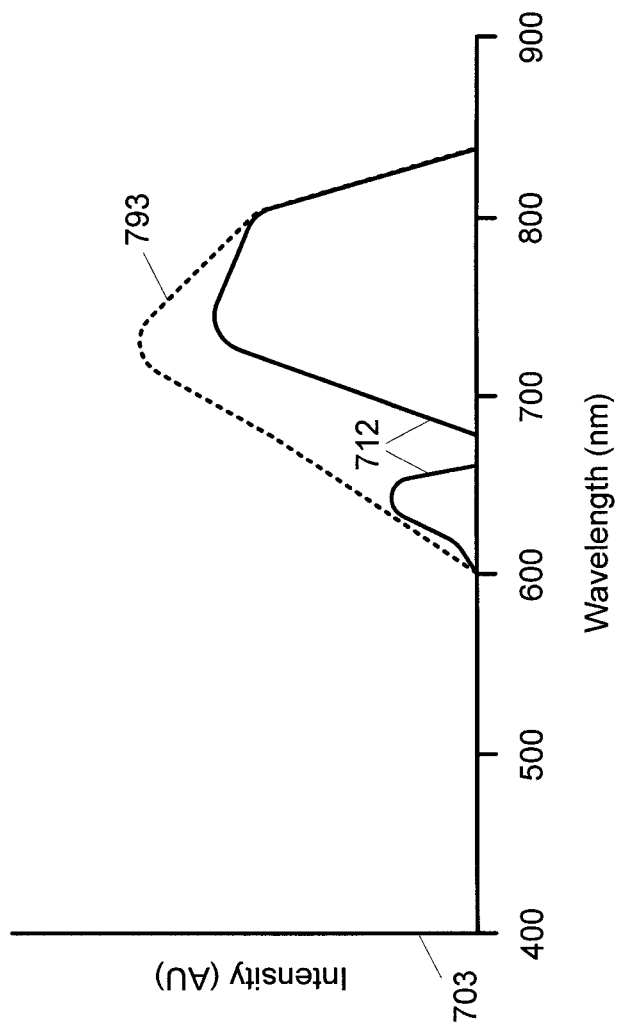
FIG. 7 depicts a reduction of intensity of the infrared images by integrating a night vision goggle response to the red-green-blue components of an image viewable by a human visual system to determine a total intensity thereof, and reducing the intensity of infrared images by the total intensity as a function of wavelength, according to non-limiting implementations.

Alternatively, intensity of second images 112 provided at display device 103 can be reduced by second visual sensor system intensity component 511 as a function of wavelength, for example in implementations where projector 210 is configured to control a shape of spectral radiance curve 312 for second images 112. For example, with reference to graph 703 in FIG. 7, second visual sensor system intensity component 511 can be subtracted from spectral radiance curve 312, as a function of wavelength, to produce adjusted spectral radiance curve 712. Hence, second images 112 are projected having adjusted spectral radiance curve 712 such that when first images 111 having second visual sensor system intensity component 511 are concurrently provided with second images 112 having adjusted spectral radiance curve 712, the total brightness viewed by second visual sensor system 102 is a sum of visual sensor system intensity component 511 and adjusted spectral radiance curve 712, which produces total intensity curve 793 similar to spectral radiance curve 312 and hence total intensity curve 793 as viewed by second visual sensor system 102 results a brightness similar to the brightness of spectral radiance curve 312. Again, brightness of common features 113 of images 111 will contribute to the brightness of common features 114 of images 112 at second visual sensor system 102.

Hence, in these implementations, controller 201 determines each of each of components 411-B, 411-G, 411-R, as well as spectral radiance curve 312, for example by processing images 111, 112 and response curve 122, and in turn produces projection data corresponding to images 112 having an adjusted spectral radiance curve 712.

Furthermore, in either of the implementations described herein, first images 111 can comprise one or more of blue images, green images and red images, and second images 112 can comprise infrared images, and controller 201 can be configured to determine second visual sensor system intensity component 511 of first images 111 using response curve 122 of second visual sensor system 102 by: multiplying response curve 122 by each spectral radiance curve 311 of each of first images 111 (and/or of light sources of projector 210-1), and summing results of each multiplication, as function of wavelength. Furthermore, such a determination can occur on a pixel-by-pixel basis. Put another way, controller 201 can be configured to determine second visual sensor system intensity component 511 of first images 111 using response curve 122 of second visual sensor system 102 by multiplying response curve 122 by each spectral radiance curve 311 of one or more of: each light source of the first projector 210-1, and first images 111; and summing results of each multiplication.

In other words, controller 201 can be further configured to determine a second visual sensor system intensity component 511 of first images 111 using response curve 122 of second visual sensor system 102 as a function of wavelength, and on a pixel-by-pixel basis. In addition, controller 201 can be further configured to reduce the intensity of second images 112 (provided at display device 103) by second visual sensor system intensity component 511 of first images 111, by a total intensity, or as a function of wavelength, as well as on a pixel-by-pixel basis.

Persons skilled in the art will appreciate that there are yet more alternative implementations and modifications possible. While method 300 was described with respect to response curve 122 comprising an NVIS-B response curve, response curve 122 can comprise an NVIS-A response curve, or any other NVIS response curve.

Furthermore, in some implementations, first images 111 can comprise one or more of blue images, green images and red images, and second images 112 can comprise respective red images rather than strictly infrared images. For example, with reference to FIG. 3, first images 111 can comprise blue images having response curve 311-B, green images having response curve 311-G, and red images having response curve 311-R; however, second images 112 can comprise red images having response curve 311-R, which can be the same or different as the red images from first images 111. In other words, in these implementations, system 100 relies solely on infrared data encoded in red images to provide images detected by the second visual sensor system 102.

Hence, rather than sum each of components 411-B, 411-G, 411-R to produce total second visual sensor system intensity component 511, in these implementations controller 201 multiplying response curve 122 by each spectral radiance curve 311-B, 311-G of each of the blue images and the green images, to produce components 411-B, 411-G, sums the results of each multiplication to produce a second visual sensor system intensity component includes only blue and green components 411-B, 411-G, and reduces the intensity of the red images by the result, similar to the reduction of spectral radiance curve 312 to produce adjusted and/or reduced spectral radiance curves 612, 712, as described above.

Hence, in these implementations, first images 111 comprise one or more of blue images, green images and red images, and second images 112 comprise the red images, and controller 201 can be further configured to determine the second visual sensor system intensity component of first images 111 using response curve 122 of second visual sensor system 102 by: multiplying response curve 122 by each spectral radiance curve of each of the blue images and the green images, and summing results of each multiplication. The second visual sensor system intensity component is then used to reduce the intensity of the red images.

Indeed, as the second visual sensor system intensity component by which the red images are reduced is generally in an infrared range, such a reduction is generally not noticeable to first visual sensor system 101 and/or if the reduction is noticeable, it is generally only in the far-red and has little effect on the RGB appearance of first images 111.

There are yet more alternative implementations and modifications possible. For example, while present implementations are described with respect to projectors, display device 103 can comprise any display device configured to provide images 111, 112 as described herein, including, but not limited to, one or more cathode ray tubes ("CRT"), one or more flat panel displays (such as liquid crystal displays, organic light emitting diode displays, plasma displays, and the like) configured to produce images viewable by both visual sensor systems 101, 102. In some of these implementations, such displays provide RGB images, while in other implementations, such displays can be specifically configured to provide infrared images and RGB images.

Furthermore, while present implementations have been described with respect to RGB images and infrared images, and corresponding HVS and NVIS sensor systems, systems and methods provided herein can be adapted for any visual sensor systems having respective wavelength sensitivity ranges that at least partially overlap. For example, in simulation environments, and the like, where a ultraviolet visual sensor system is used in place of an infrared sensor system, intensity of ultraviolet images can be reduced by ultraviolet components of RGB images. Similarly, in simulation environments, and the like, that include two visual sensor systems imaging in two adjacent and at least partially overlapping wavelength ranges (which does not necessarily include human visible wavelengths), intensity of images viewable by one visual sensor system can be reduced by a visual sensor system intensity component of images viewable by the other visual sensor system.

Indeed, such a reduction can occur for both visual sensor systems. For example, with reference to FIG. 3, a response curve 121 of first visual sensor system 101 can be used to determine a human visual component of spectral radiance curve 312 of second images 112, and an intensity of images 111 could be reduced accordingly.

There are yet more alternative implementations and modifications possible. For example, in system 100 spectral radiance curves 131 (e.g. spectral radiance curves 311, 312) are depicted as being stored at memory 120. In some implementations, spectral radiance curves 131 can be provisioned at memory 120 at a factory and/or in a provisioning process, in which spectral radiance curves 131 are provisioned at memory 120 by receiving spectral radiance curves 131 from an external device using interface 224. However, in other implementations system 100 can be adapted to determine one or more of spectral radiance curves 131, and store one or more spectral radiance curves 131 at memory 120.

Figure 8:
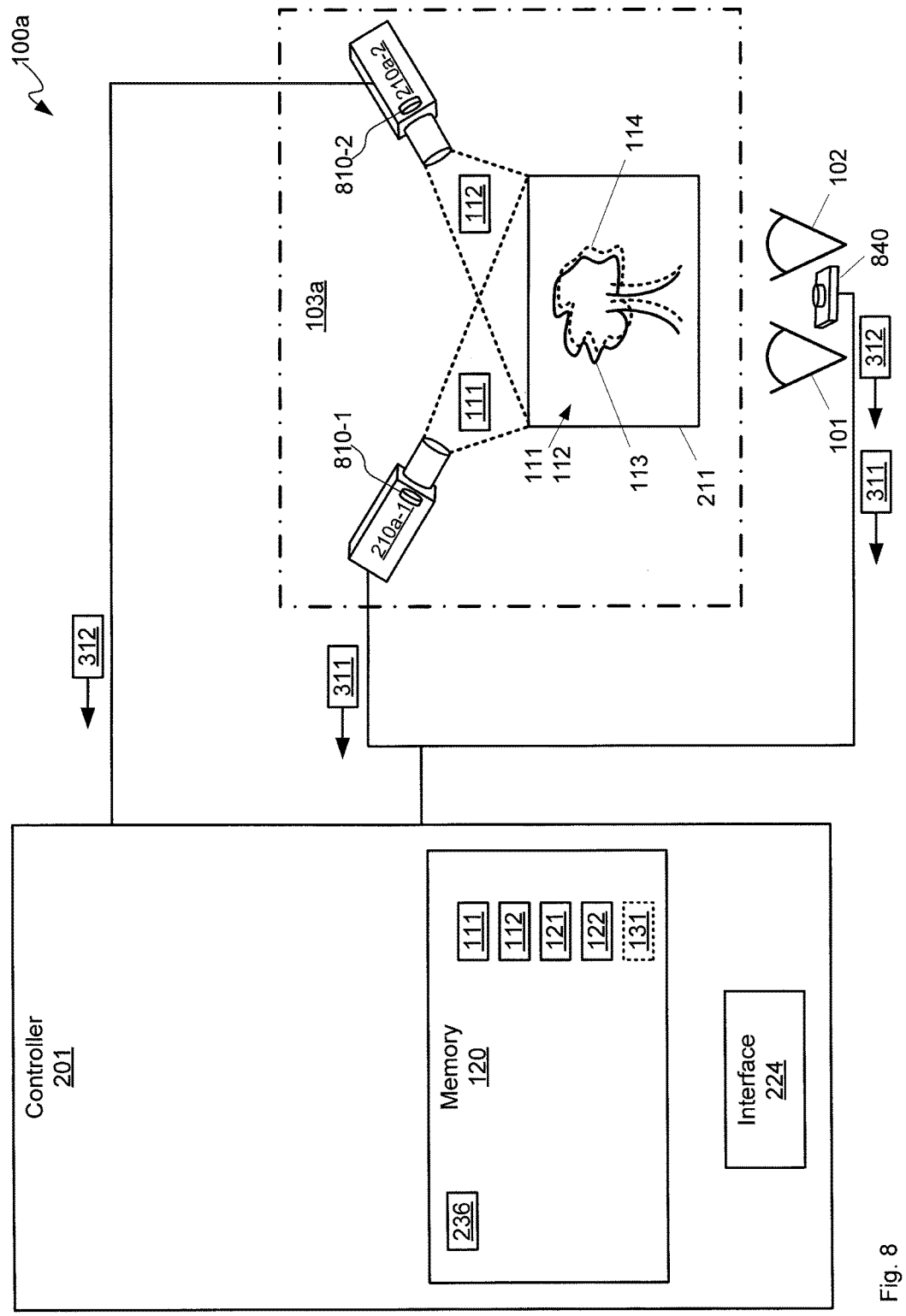
FIG. 8 depicts an alternative system for cross-talk reduction in visual sensor systems, according to non-limiting implementations.

For example, attention is next directed to FIG. 8, which depicts an alternative depicts a system 100a for reducing cross-talk in visual sensor systems. System 100a is substantially similar to system 100 with like elements having like numbers. However, in system 100, a display device 103a has been adapted to include projectors 210a-1, 210a-2 which include respective sensors 810-1, 810-2. Otherwise, display device 103a and projectors 210a-1, 210a-2 are substantially similar, respectively, to display device 103 and projectors 210-1, 210-2. Projectors 210a-1, 210a-2 will interchangeably be referred to hereafter, collectively, as projectors 210a and, generically, as a projector 210a. Similarly, sensors 810-1, 810-2 will interchangeably be referred to hereafter, collectively, as sensors 810 and, generically, as a sensor 810.

Each sensor 810 is configured to sense spectral radiance curves 131 of respective illuminators of projectors 210a. For example, sensor 810-1 is configured to sense spectral radiance curves 311 of each light source of projector 210a-1 (e.g. red, green and blue light sources). Similarly, sensor 810-2 is configured to sense spectral radiance curve 31s of the light source of projector 210a-a (e.g. an infrared light source). Each sensor 810 hence generally comprises a photometer, a spectrophotometer, and the like, configured to sense light as a function of wavelength and can be located anywhere in a respective projector 210a to sense light produced by respective light sources. Indeed, as depicted in FIG. 8, each projector 210a can use a respective sensor 810 to sense respective spectral radiance curves of respective light sources, and transmit the respective spectral radiance curves to controller 201 for storage at memory 120.

For example, as depicted, projector 210a-1 transmits spectral radiance curves 311 to controller 201, and projector 210a-1 transmits spectral radiance curve 312 to controller 201, where controller 201 stores spectral radiance curves 311, 312 as spectral radiance curves 131 at memory 120. Indeed, in FIG. 8 spectral radiance curves 131 at memory 120 are depicted in broken lines as initially spectral radiance curves 131 may be not stored at memory 120.

Indeed, FIG. 8 depicts a provisioning process in which spectral radiance curves 131 (e.g. spectral radiance curves 311, 312) are provisioned at memory 120; in some implementations, when system 100a is turned on, and/or installed, controller 201 can request spectral radiance curves 311, 312 from each of projectors 210a, while, in other implementations, projectors 210a can push and/or transmit spectral radiance curves 311, 312 to controller 201 without a request. Either way, when controller 201 receives spectral radiance curves 311, 312 from each of projectors 210a, controller 201 stores spectral radiance curves 311, 312 in spectral radiance curves 131 at memory 120. When spectral radiance curves 131 are not initially stored at memory 120, controller 201 provisions spectral radiance curves 131 at memory 120 using spectral radiance curves 311, 312. When spectral radiance curves 131 are initially stored at memory 120 (e.g. in a previous provisioning process), controller 201 updates spectral radiance curves 131 at memory 120 using spectral radiance curves 311, 312 (for example replacing any previous spectral radiance curves with spectral radiance curves 311, 312).

Indeed, one or more of the processes depicted in FIG. 8 can be repeated periodically, for example to update one or more spectral radiance curves 131 at memory 120 in the event that one or more of spectral radiance curves 311, 312 change over time. For example, controller 201 can periodically request one or more spectral radiance curves 311, 312 from projectors 210a and/or projectors 210a can periodically transmit spectral radiance curves 311, 312 to controller 201. Alternatively, each projector 210a can be configured to monitor respective light sources thereof using a respective sensor 810 and when change in one or more respective light sources is detected (e.g. a change in absolute and/or relative brightness, and/or a change in a distribution of wavelengths, and the like), a projector 210a can transmit one or more spectral radiance curves 311, 312 to controller 201 either for the light sources where a change is detected, and/or for all of the light sources.

As depicted, system 100a further comprises an optional sensor 840, which can be similar to sensors 810, but located to sense light from display device 103a (e.g. light reflected from screen 211). Sensor 840, when present, is in communication with controller 201. For example, sensor 840 can be adjacent to sensor systems 101, 102 and/or incorporated into one or more of sensor systems 101, 102. Hence, in an alternative provisioning process and/or monitoring process, sensor 840 can detect one or more spectral radiance curves 311, 312 and transmit to controller 201. In some implementations, each of projectors 210a can be controlled by controller 201 to initially, and/or periodically, project onto screen 211 images using each respective light sources in a sequence, such that sensor 840 can determine each of one or more spectral radiance curves 311-B, 311-G, 311-R, 312 in a sequence and transmit one or more spectral radiance curves 311-B, 311-G, 311-R, 312 to controller 201. Alternatively, controller 201 can determine when images 111, 112 of one color (e.g. using only one light source of projectors 210a) are being projected on screen 211, and control sensor 840 to acquire a corresponding spectral radiance curves 311-B, 311-G, 311-R, 312.

Furthermore, in FIG. 8, sensor 810-1 can be optional, sensor 810-2 can be optional and/or sensor 840 can be optional. For example, when sensor 810-2 is present, but sensors 810-1, 840 are not present, system 100a is configured to provision and/or monitor only light sources (e.g. an infrared light source) of projector 210a-2, and it is assumed that spectral radiance curves of light sources of projector 210a-1 are provisioned at memory 120 for example at a factory and/or in a provisioning process that does not include sensors 810-1, 840. Similarly, when sensor 810-1 is present, but sensors 810-2, 840 are not present, system 100a is configured to provision and/or monitor only light sources (e.g. red, green and blue light sources) of projector 210a-1, and it is assumed that spectral radiance curves of light sources of projector 210a-2 are provisioned at memory 120 for example at a factory and/or in a provisioning process that does not include sensors 810-2, 840.

In general, this disclosure is directed to a device and method for reducing cross-talk in visual sensor systems in which first images viewable by a first visual sensor system and second images viewable by a second visual sensor system are concurrently provided at a display device. The methods described herein can be advantageously applied to night vision flight simulators to provide a more realistic training environment.

Those skilled in the art will appreciate that in some implementations, the functionality of controller 201 can be implemented using pre-programmed hardware or firmware elements (e.g., application specific integrated circuits (ASICs), electrically erasable programmable read-only memories (EEPROMs), etc.), or other related components. In other implementations, the functionality of controller 201 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
a display device configured to provide first images, viewable by a first visual sensor system, and second images, viewable by a second visual sensor system, the first images and the second images having common features which align when the first images and the second images are provided concurrently, first images comprising wavelengths viewable by the second visual sensor system; and,
a controller configured to:
determine a second visual sensor system intensity component of the first images using a response curve of the second visual sensor system; and,
reduce intensity of the second images provided at the display device by the second visual sensor system intensity component of the first images, at least when the first images and the second images are concurrently provided,
wherein the first images comprise one or more of blue images, green images and red images, and the second images comprise one or more of the red images and infrared images,
the controller further configured to determine the second visual sensor system intensity component of the first images using the response curve of the second visual sensor system by:
multiplying the response curve by each spectral radiance curve of one or more of: the first images; and a light source used to form the first images; and
summing results of each multiplication.

2. The system of claim 1, further comprising a memory storing: the response curve of the second visual sensor system and spectral radiance curves of one or more of the first images; and the light source used to form the first images.

3. The system of claim 1, wherein the display device comprises one or more projectors configured to provide the first images and the second images concurrently by one or more of: interlacing the first images and the second images; alternating the first images and the second images; and co-projecting the first images and the second images.

4. The system of claim 1, wherein the first visual sensor system comprises a human visual system and the second visual sensor system comprises a night vision sensor ("NVIS") system.

5. The system of claim 1, wherein the first visual sensor system comprises a human visual system and the second visual sensor system comprises a night vision ("NVIS") sensor system; and the response curve comprises one or more of: an NVIS response curve; an NVIS-A response curve; and an NVIS-B response curve.

6. The system of claim 1, wherein the controller is further configured to reduce the intensity of the second images provided at the display device by the second visual sensor system intensity component by integrating the second visual sensor system intensity component to determine a total intensity thereof, and reducing the intensity of the second images by the total intensity, independent of wavelength.

7. The system of claim 1, wherein the controller is further configured to determine the second visual sensor system intensity component of the first images using the response curve of the second visual sensor system as a function of wavelength.

8. The system of claim 1, wherein the controller is further configured to reduce the intensity of the second images provided at the display device by the second visual sensor system intensity component of the first images, as a function of wavelength.

9. A method comprising:
at a system comprising: a display device configured to provide first images, viewable by a first visual sensor system, and second images, viewable by a second visual sensor system, the first images and the second images having common features which align when the first images and the second images are provided concurrently, first images comprising wavelengths viewable by the second visual sensor system; and, a controller,
determining, at the controller, a second visual sensor system intensity component of the first images using a response curve of the second visual sensor system; and,
reducing, at the controller, intensity of the second images provided at the display device by the second visual sensor system intensity component of the first images, at least when the first images and the second images are concurrently provided,
wherein the first images comprise one or more of blue images, green images and red images, and the second images comprise one or more of the red images and infrared images,
the method further comprising determining the second visual sensor system intensity component of the first images using the response curve of the second visual sensor system by:
multiplying the response curve by each spectral radiance curve of one or more of: the first images; and a light source used to form the first images; and
summing results of each multiplication.

10. The method of claim 9, wherein the display device comprises one or more projectors configured to provide the first images and the second images concurrently by one or more of: interlacing the first images and the second images; alternating the first images and the second images; and co-projecting the first images and the second images.

11. The method of claim 9, wherein the first visual sensor system comprises a human visual system and the second visual sensor system comprises a night vision sensor ("NVIS") system.

12. The method of claim 9, wherein the first visual sensor system comprises a human visual system and the second visual sensor system comprises a night vision ("NVIS") sensor system; and the response curve comprises one or more of: an NVIS response curve; an NVIS-A response curve; and an NVIS-B response curve.

13. The method of claim 9, further comprising reducing the intensity of the second images provided at the display device by the second visual sensor system intensity component by integrating the second visual sensor system intensity component to determine a total intensity thereof, and reducing the intensity of the second images by the total intensity, independent of wavelength.

14. The method of claim 9, further comprising determining the second visual sensor system intensity component of the first images using the response curve of the second visual sensor system as a function of wavelength.

15. The method of claim 9, further comprising reducing the intensity of the second images provided at the display device by the second visual sensor system intensity component of the first images, as a function of wavelength.

16. A non-transitory computer-readable medium storing a computer program, wherein execution of the computer program is for:

at a system comprising: a display device configured to provide first images, viewable by a first visual sensor system, and second images, viewable by a second visual sensor system, the first images and the second images having common features which align when the first images and the second images are provided concurrently, first images comprising wavelengths viewable by the second visual sensor system; and, a controller, determining, at the controller, a second visual sensor system intensity component of the first images using a response curve of the second visual sensor system; and, reducing, at the controller, intensity of the second images provided at the display device by the second visual sensor system intensity component of the first images, at least when the first images and the second images are concurrently provided, wherein the first images comprise one or more of blue images, green images and red images, and the second images comprise one or more of the red images and infrared images, execution of the computer program being further for determining the second visual sensor system intensity component of the first images using the response curve of the second visual sensor system by:

multiplying the response curve by each spectral radiance curve of one or more of: the first images; and a light source used to form the first images; and summing results of each multiplication.

* * * * *